Figure 1:
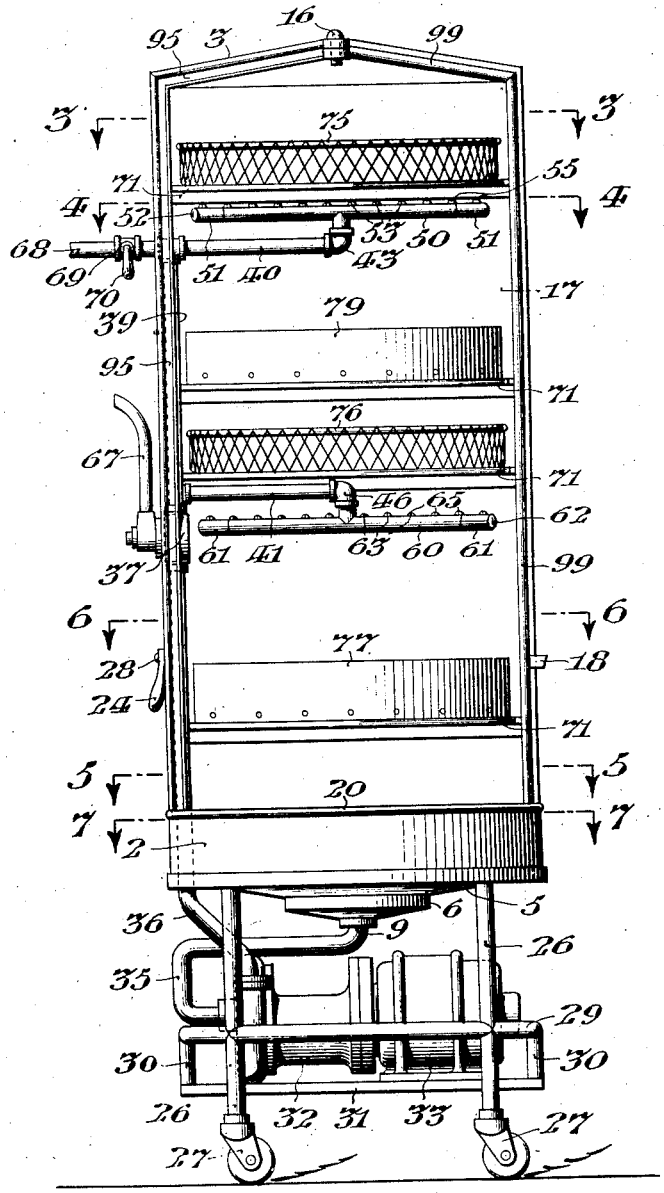

Dec. 5, 1933. F. G. WALKER 1,937,738
DISHWASHING MACHINE
Filed Sept. 16, 1930 2 Sheets-Sheet 1

Inventor
Frank G. Walker,
By Clifton C. Callowell
Attorney

Dec. 5, 1933.   F. G. WALKER   1,937,738
DISHWASHING MACHINE
Filed Sept. 16, 1930   2 Sheets-Sheet 2
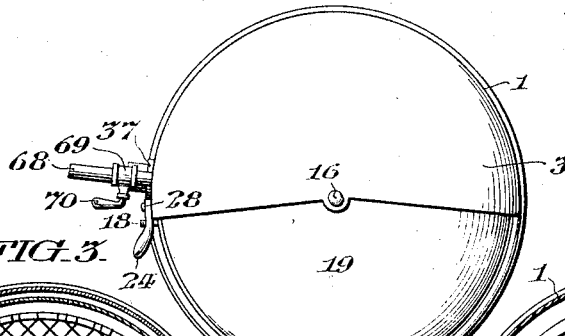
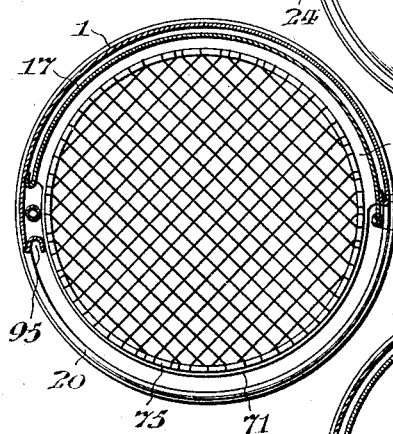
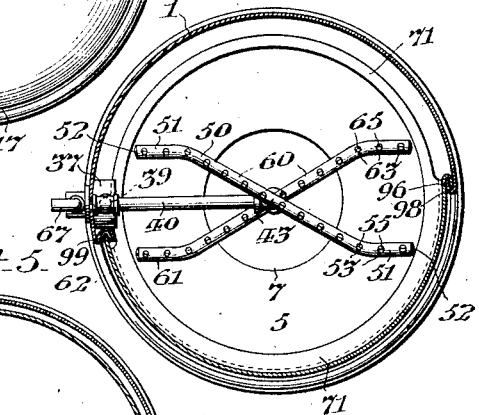
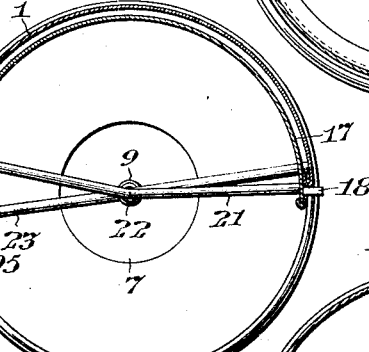
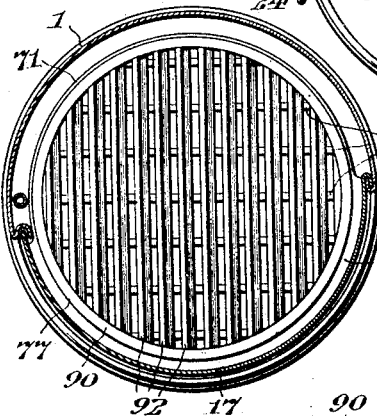
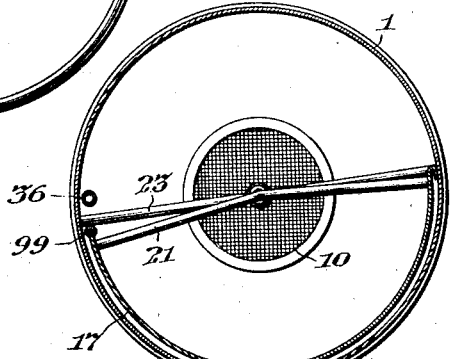
Inventor
Frank G. Walker
Attorney Patented Dec. 5, 1933

1,937,738

UNITED STATES PATENT OFFICE 1,937,738

DISHWASHING MACHINE

Frank G. Walker, Santa Barbara, Calif.

Application September 16, 1930
Serial No. 482,212

3 Claims. (Cl. 141—9)

This invention relates particularly to that type of dish-washing machines that may be best adapted to household use, and is especially directed to the novel arrangement of the parts by which its operation is facilitated.

The principal objects of my invention are to provide a dish-washing machine of pleasing appearance that will efficiently wash and dry quickly and thoroughly at one time all dishes of various kinds from an ordinary household table with but a minimum of handling.

Other objects of my invention are to provide a dish-washing machine with a plurality of dish-holding racks disposed one above the other, each being accessible for placing dishes thereon or removing them therefrom without displacing or in any way disturbing any other of said racks of dishes.

Further objects of my invention are to provide a dish-washing machine that will afford a maximum of efficiency by so disposing the operative elements in such cooperative relation that the force of water deflected by the cupped or bowl-shaped dishes is utilized advantageously to wash by a splashing action the substantially flat dishes such as plates or platters and the silverware.

My invention comprehends a dish-washing machine having a disappearing semi-cylindrical closure which conserves space and which so cooperates with the semi-cylindrical casing when closed as to not only provide a watertight receptacle affording a spacious chamber for the dishes, but also tends to retain the heat of the hot water employed in said chamber.

Another object of my invention is to so simplify the casing structure as to not only reduce the maximum weight of the assembled machine, but to greatly reduce its costs of manufacture, and facilitate cleansing of all remote internal surfaces, whereby a maximum sanitary condition is at all times insured.

Specifically stated, the form of my invention as hereinafter described comprises a dish-washing machine having a casing including a cylindrical base provided with an inverted conical down-set floor serving as a reservoir for the water to be circulated and having a semicylindriform body and sloping top, in which a semicylindrical closure or door may be oscillated to open or close the casing as desired; said door being provided with a plurality of annular grilles upon which racks or baskets carrying dishes may be removably supported in position to be sprayed by rotatable perforated tubular arms or manifolds connected centrally by pipe branches through a supply pipe, extending within said casing, with an electrically actuated pump and controlled by a three-way-valve, the operating handle of which serves as a spout for the discharge of the used water from said reservoir to a sink or other suitable drain, said pipe being provided with a valved inlet through which hot water may be introduced.

My invention also includes all the various novel features of construction and arrangement as hereinafter more definitely specified.

In the accompanying drawings, Figure 1 is a front elevational view of a dish-washing machine constructed in accordance with my invention, and showing the door or closure open and disclosing the interior arrangement; Fig. 2 is a plan view of the machine as shown in Fig. 1, with the door or closure in its closed position; Fig. 3 is a horizontal sectional view of said machine taken on a plane indicated by the line 3—3 in Fig. 1, and showing the upper basket; Fig. 4 is a horizontal sectional view taken on a plane indicated by the line 4—4 in Fig. 1, and showing the arrangement of the sprayer arms or manifolds, the other parts within the chamber being removed for convenience of illustration; Fig. 5 is a horizontal sectional view taken on a plane indicated by the line 5—5 in Fig. 1, and showing the lower supporting arrangement; Fig. 6 is a horizontal sectional view taken on a plane indicated by the line 6—6 in Fig. 1, and showing the lower dish-holding tray or rack, in this view the door or closure being shown in closed position; Fig. 7 is a horizontal sectional view taken on a plane indicated by the line 7—7 in Fig. 1, and showing the outlet strainer, the other parts within the chamber being removed for convenience of illustration, and the door or closure being shown in closed position; and Fig. 8 is a central vertical sectional view of the dish-holding tray or rack shown in plan in Fig. 6.

In said figures, the body of the machine comprises the semicylindrical casing 1 rising from the cylindrical basin or reservoir 2 and terminating in the semi-conical roof 3. Said basin or reservoir has the conical hopper bottom 5 provided with a downset central depression 6 forming the pocket 7 having a discharge orifice through which the discharge pipe 9 extends, and affording a convenient recess for the strainer 10 which is readily removable and replaceable.

The upper wall or roof 3 is provided with the headed pin 16, affording a pintle for the pivoted door or closure 17, which is semicylindriform and which so closely conforms to the casing 1 and roof 3 as to rotate into said casing as indicated in Figs.

3, 4 and 5, or be withdrawn therefrom into complemented relation to provide a cylindrical receptacle as indicated in Figs. 1, 2, 6 and 7.

Said closure 17 depends below the upper rim 20 of the basin or reservoir 2, and is provided with the crossbar 21 pivotally supported upon the ball-bearing 22 on the supporting crossbar 23 which extends diametrically across said basin or reservoir 2, as shown in Figs. 5 and 7.

The door or closure 17 is arranged to be retained in its closed position by a well known type of refrigerator lock comprising the keeper 18 which projects radially from the forward margin of the closure 17 and the pivoted latch handle 24 which is pivoted at 28 to the forward margin of the casing 1 and projects forwardly to engage said keeper.

The structure thus described is provided with the supporting stand comprising an annular frame having the standards 26 terminating in the roller casters 27 and connected by the circular brace-bar 29 from which depends the hangers 30 carrying the underslung shelf 31 upon which the pump 32 and its driving medium, the electric motor 33, are conveniently supported.

As shown in Fig. 1, the inlet of the pump 32 is connected with the outlet of the basin or reservoir 2 by the pipe 35, and the outlet of said pump is connected by the pipe 36 with the three-way valve 37 which is connected by the pipe 39 with the branches 40 and 41, the former having the upturned elbow 43 and the latter having the downturned elbow 46.

Rotatably mounted upon the elbow 43 is a tubular arm or manifold 50 having its end portions 51 bent slightly in opposite directions in a horizontal plane and provided with axially directed orifices 52 through which fluid may be ejected for a twofold purpose, first, to cause said manifold to rotate upon said elbow and second, to flush the inner wall surface of the chamber.

Said manifold 50 is also provided along its upper surface with a plurality of nozzles 53 each preferably provided with a transverse slit 55 through which fluid may be ejected, and although I have, for convenience of illustration, shown said slits 55 disposed in the direction of rotation of said manifold in Fig. 1, they may preferably be disposed parallel to the axis of said manifold as indicated in Fig. 4 so that the fan-shaped jets ejected therefrom may relatively overlap each other.

Similarly, the elbow 43 rotatably carries the manifold 60 having its end portions 61 bent in opposition to that of the manifold 50 so that the fluid ejected from the axially directed orifices 62 thereof will cause the manifold 60 to rotate in a direction opposite to the rotation of the manifold 50, and the fluid ejected upwardly through the slits 65 of the nozzles 63 will be flung differently from the fluid ejected from the manifold 50, and consequently there will be a wide diffusion of the spray thus ejected.

The three-way-valve 37, above referred to, comprises the controlling handle 67 which is tubular and which so connects with one of the valve passageways that when turned from the position shown in Fig. 1 to a substantially horizontal position, the fluid passing through the pipe 36 will be diverted from the pipe 39, and will be discharged through said handle 67 serving as a nozzle to direct said fluid to a sink or other receiver.

The pipes 36 and 39 and the three-way-valve 37 may be disposed within the receptacle along one forward margin of the casing 1 and the operating handle 67 of said valve be extended exterior to said casing for convenient manipulation as shown. The pipe 39 is provided with the inlet branch 68 extending exterior to the casing 1 and having the valve 69 provided with the controlling handle 70 whereby the machine may be connected directly with a water heater or house system to introduce hot water into the machine.

The door or closure 17 is provided with a plurality of suitably spaced annular grilles 71 serving as braces for said closure, disposed with particular reference to the manifolds 50 and 60 and may be conveniently formed of angle iron having the portion which is free from the door, between the free edges thereof, cut away to clear the pipe 39.

As shown in Figs. 6 and 8, the dish-carrying rack 77 is adapted particularly for carrying flat dishes, such as plates, supported on their edges and in a slightly inclined substantially upright position, and therefore to prevent unnecessary rattling and possible chipping of the finer chinaware said rack may preferably be formed of wood or a material having similar characteristics. Said rack 77 comprises the outer circular rim 90 forming an annulus having closely adjacent its lower margin a plurality of transverse bars 91, above which are disposed in crossed relation thereto a series of slats 92 slightly inclined to cause the plates disposed between them and resting upon said bars to assume such a cant as to cause the cleansing fluid directed downwardly thereon to strike in a glancing manner.

As shown in Fig. 1, the grilles 71 that are closely associated in superposed relation to the respective manifolds 50 and 60 removably support the wire mesh baskets 75 and 76 that are particularly adapted to carry cups or bowls or similar cup-shaped dishes in an inverted position to receive therein substantially the full force of the jet or spray ejected through the nozzles 53 and 63 and to cooperate therewith in deflecting the fluid downward therefrom by a splashing action on to the dishes carried by the racks 77 and 79 respectively subjacent to the baskets 75 and 76.

It is desirable that heat and steam may be retained within the chamber as well as the water being splashed around therein, and therefore the marginal edges of the casing 1 are so rebent as to form grooves 95 and 96 in which the free edges of the door or casing may be received when in closed position as shown in Figs. 1, 6 and 7. These grooves may be provided with a sealing medium such as rubber, felt or other suitable material 98, and the free edges of the door may also be provided with buffers 99 as shown.

Obviously the hot water may be introduced through the branch pipe 68, then with the valve 70 closed, the pump 32 circulates cleansing fluid through the pipes 36 and 39 and manifold 50 and 60 until the dishes are cleansed, the three-way-valve is then turned to stop flow of fluid through pipe 39 and discharge it through its handle spout or nozzle 67 into the sink or receiver, now while the pump is running fresh cleansing hot water may be again introduced through the inlet branch and the machine and dishes therein flushed until thoroughly rinsed, the water entering is discharged by the pump, into said sink.

It may be here noted that by the arrangement of the parts as herein shown and described, substantially one-half of the washing chamber is without obstruction when the door or closure is swung back and therefore unhampered access is had to the interior for the manipulation of the dishes or parts, or removing and replacing the baskets or racks and the strainer, and when said door is closed, a chamber is formed which has no flat surfaces to invite the collection of refuse and no corners that might cause eddying currents.

My invention is advantageous in that by the arrangement of the cooperative parts all of the fluid is directed upwardly from the nozzles into the bowl-shaped dishes and is thereby deflected with force and splashed downwardly on to the dishes on the racks beneath, thus the dishes to which grease mostly adheres, or what may be considered the more soiled dishes, and silverware carried by the lower trays are subjected to the action of all of the fluid discharged from the nozzles of both of the manifolds.

This machine is especially designed for use in private homes where all types of dishes from the table may be quickly and thoroughly washed at a single operation and wherein the cleansing fluid may be conveniently discharged and rinsing water substituted without stopping the actuating mechanism.

I do not desire to limit my invention to the precise details of construction and arrangement as herein set forth, as it is obvious that various modifications may be made therein without departing from the essential features of my invention as defined in the appended claims.

Having thus described my invention, I claim:

1. A dish-washing machine comprising a substantially semi-cylindrical body, a substantially semi-cylindrical door pivotally connected to rotate on a vertical axis within said body and complementary thereto to form a cylindrical receptacle, means within said receptacle arranged to direct sprays of cleansing fluid, and means carried by said door arranged to support dishes above and below the spray directing means.

2. A wish-washing machine comprising a semi-cylindriform casing which merges into a cylindrical base forming a basin, and a semicylindrical door pivoted to rotate on a central vertical axis with respect to said casing and complementary therewith to form a closed receptacle, means arranged to direct sprays of cleansing fluid upwardly in said receptacle, and means on said door arranged to support dishes in positions to be sprayed respectively by direct and deflected jets of cleansing fluid.

3. A dish-washing machine comprising a substantially semicylindrical body, a substantially semicylindrical door pivotally connected to rotate on a vertical axis within said body and complemental thereto to form a cylindrical receptacle, means within said receptacle arranged to direct sprays of cleansing fluid, and relatively spaced annular braces for said door arranged to support dishes above and below the spray directing means.

FRANK G. WALKER.